Patented Oct. 2, 1945

2,385,848

UNITED STATES PATENT OFFICE 2,385,848

AMINE SALTS OF DINITROPHENOLS

Frank B. Smith and John N. Hansen, Midland, Mich., assignors to The Dow Chemical Company, Midland, Mich., a corporation of Michigan No Drawing. Application April 30, 1941, Serial No. 391,093

2 Claims. (Cl. 260—583)

This invention relates to amine salts of phenols and is particularly concerned with the addition products of dinitrophenols with amines of the alkylene-diamine and polymethylene-diamine type having the following formula:

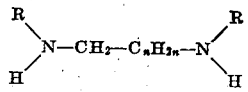

wherein R represents an alkyl, alkenyl, hydroxyalkyl, aralkyl, or cycloalkyl radical or hydrogen, and $n$ is an integer, and to parasiticidal compositions comprising such amine salts as active toxicants. For purpose of convenience the amines employed as starting materials in the preparation of the foregoing compounds are hereinafter referred to generically as alkylenediamines.

We have prepared representative members of the above-identified group of compounds and found them for the most part to be crystalline solids difficultly soluble in water and somewhat soluble in many common organic solvents. These compounds are stable to light and air, not appreciably affected by carbon dioxide and are yellow to orange-red in color. Preferred groups of amine salts are obtained from those dinitrophenols characterized by nuclear substituted nitro groups in the para position and in one of the positions ortho to the hydroxyl.

A group of compounds falling within the scope of the invention as defined above which are particularly valuable for use in insecticidal and fungicidal spray and dust compositions are those alkylene-diamine salts derived from 2.4-dinitrophenols having the formula:

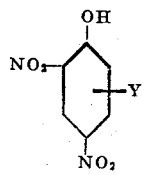

wherein Y represents an aryl, cycloalkyl, aralkyl, or alkyl radical or hydrogen.

The new compounds are prepared by reacting a suitable amine compound such as ethylenediamine, propylene-diamine, N.N'-dibutylethylene-diamine, or N-cyclohexyl-propylene-diamine with a solution of a dinitro-phenol in benzene, chlorobenzene, toluene, or alcohol. In this reaction either a mono-salt or di-salt may be formed depending upon the proportions of reactants employed. The expression "monosalt" as herein employed refers to an alkylenediamine addition compound with a dinitrophenol in which but one molecule of the phenol is associated with each alkylene-diamine molecule. The expression "di-salt" refers to amine addition salts in which 2 molecules of the dinitro-phenol are associated with each molecule of the alkylene-diamine.

In carrying out the reaction any suitable amounts of reactants may be employed. It has been found that the mono-salt is obtained in good yield when equimolecular proportions of the dinitro-phenol and the amine or an excess of the amine is employed. The di-salt is obtained in good yield and as the primary product of reaction when at least two molecular proportions of dinitro-phenol are employed for each proportion of the amine. Where an unreacted excess of one or the other reactant is present in the final product, separation is readily accomplished by extraction of the crude amine addition salt product with benzene or other selective solvent for the dinitro-phenol or amine and in which the amine salt is difficultly soluble.

The operating temperatures employed in the reaction are not critical, although reduced amounts of solvents are required at somewhat elevated temperatures, e. g. between about 40° and 120° C. and conveniently at the boiling temperature of the reaction mixture. While the reactants and solvent may simply be mixed together, a convenient method of operation comprises adding a solution of one reactant to the other. To insure the formation of a relatively homogeneous product and to minimize occlusion, the amine is preferably added portionwise with stirring to a solution of the dinitro-phenol over a short period of time. Following completion of the reaction, the mixture is filtered or otherwise manipulated to separate out the amine salt which may be further purified by washing with small amounts of organic solvents as described above or by recrystallization. The amine salt obtained is then dried at a temperature calculated to volatilize residual traces of solvent.

The following examples set forth certain embodiments of the invention, but are not to be construed as limiting the same.

*Example 1*

26.6 grams (0.1 mol) of 2.4-dinitro-6-cyclohexyl-phenol was dissolved in 30 milliliters of hot benzene and 6.0 grams (0.1 mol) of ethylenediamine added portionwise thereto with stirring.

The mixture was warmed and stirred at 60°–80° C., an addition salt of the amine and phenol precipitating from solution. The mixture was then cooled and filtered to obtain a residue of 32 grams of the ethylene-diamine mono-salt of 2.4-dinitro-6-cyclohexyl-phenol as a yellow crystalline solid melting at 191°–192° C. This compound was soluble to the extent of 0.025 gram per 100 grams of water at 25° C. The pH of the saturated water solution was 9.12.

*Example 2*

79.8 grams (0.3 mol) of 2.4-dinitro-6-cyclohexyl-phenol was dissolved in 100 milliliters of hot benzene and 57.6 grams (0.226 mol) of N.N'-di-(2-methyl-cyclohexyl)-ethylene-diamine added portionwise thereto over a period of 15 minutes and at a temperature ranging between 60° and 80° C. The reaction mixture was heated and stirred for an additional 15 to 20 minutes and thereafter cooled and filtered to obtain the amine di-salt as a yellow crystalline residue. This crude product was washed with cold benzene and dried at 70° C. to obtain the N.N'-di-(2-methyl-cyclohexyl)-ethylene-diamine di-salt of 2.4-dinitro-6-cyclohexyl-phenol melting at 205°–207° C. This compound was soluble to the extent of 0.0056 gram per 100 grams of water at 25° C. The saturated water solution had a pH of 8.4.

The N.N'-di-(2-methyl-cyclohexyl)-ethylene-diamine herein employed is a viscous liquid boiling at 165° C. at 8 millimeters pressure and having a specific gravity of 0.92 at 20°/4° C. This compound is prepared by reacting 2-methyl-cyclohexyl-amine with ethylene chloride or ethylene bromide under conditions of elevated temperature and pressure and neutralizing the resultant amine hydrohalide with aqueous sodium hydroxide.

*Example 3*

In a similar manner 39.6 grams (0.2 mol) of 2.4-dinitro-6-methyl-phenol and 14.8 grams (0.2 mol) of propylene-diamine were reacted together in the presence of 50 milliliters of benzene and at a temperature of 50° C. The reacted mixture was cooled, and filtered, and the residue washed with cold benzene to obtain 50.5 grams of the propylene-diamine mono-salt of 2.4-dinitro-6-methyl-phenol as a yellow crystalline compound melting at 171°–174° C. This compound was soluble in water to the extent of 0.567 gram per 100 grams of water at 25° C. The saturated water solution had a pH of 9.8.

*Example 4*

39.6 grams (0.2 mol) of 2.4-dinitro-6-methyl-phenol was dissolved in 50 milliliters of boiling benzene and 25.2 grams (0.1 mol) of N.N'-di-(2-methyl-cyclohexyl)-ethylene-diamine added portionwise thereto substantially as described in Example 2. After heating and stirring for some time the mixture was cooled, filtered and the crystalline residue washed with benzene to obtain 60.5 grams of the N.N'-di-(2-methyl-cyclohexyl)-ethylene-diamine di-salt of 2.4-dinitro-6-methyl-phenol. This compound melting at approximately 176° C. and was soluble to the extent of 0.004 gram per 100 grams of water at 25° C. The pH of a saturated water solution was 7.

*Example 5*

In a similar manner 52 grams (0.2 mol) of 2.4-dinitro-6-phenyl-phenol was dissolved in 350 milliliters of hot alcohol and reacted with 7.4 grams (0.1 mol) of propylene-diamine. The reaction mixture was heated and stirred for approximately ½ hour and thereafter cooled and filtered and the crystalline residue washed with alcohol. The residue from the alcohol washing was dried at 70° C. to obtain 55.5 grams of propylene-diamine di-salt of 2.4-dinitro-6-phenyl-phenol as a yellow crystalline product melting at 193.5°–195° C. This compound is soluble to the extent of 0.254 gram per 100 grams of water to give a saturated solution having a pH of 7.4.

*Example 6*

53.2 grams (0.2 mol) of 2.4-dinitro-6-cyclohexyl-phenol was dissolved in 200 milliliters of boiling ethanol and 10.4 grams (0.1 mol) of N-(2-hydroxy-ethyl)-ethylene-diamine added portionwise thereto with stirring over a short period. Heat of reaction was evolved and a crystalline precipitate formed. After all of the amine had been added, the mixture was cooled to room temperature and filtered. The residue from the filtration was recrystallized from hot ethanol and air dried to obtain 48 grams of N-(2-hydroxyethyl)-ethylene-diamine di-salt of 2.4-dinitro-6-cyclohexyl-phenol as a yellow crystalline compound melting at 160°–163.5 C.

Other alkylene-diamines and polymethylene-diamines may be employed as shown in the examples to obtain addition salts of the dinitro-phenols. Representative of such amine compounds are N.N'-di-isobutenyl-ethylene-diamine, 1.6-diamino-hexane, 1.4-diamino-butane, 1.10-diamino-decane, 1.6 - diamino - 3 - tertiarybutyl-hexane, 1.8-diamino-octane, 1.6-diamino-2.5-dimethyl-hexane, heptamethylene-diamine, butylene-diamine, N-cyclohexyl-ethylene-diamine, N-(3-hydroxy-propyl)-ethylene-diamine, N.N'-dibenzyl-butylene-diamine, N-(beta-phenylethyl)-hexamethylene-diamine, N.N'-diethyl-octamethylene-diamine, N - isobutyl - propylene - diamine, N.N'-dipropyl-ethylene-diamine, etc. In place of the dinitro-phenols shown in the examples other representative compounds such as 2.4-dinitro-phenol, 2.4-dinitro-6-ethyl-phenol, 2.4-dinitro-6-n-hexyl-phenol, 2.4-dinitro - 6 - n - octyl-phenol, 2.4-dinitro-6-benzyl-phenol, 2.4-dinitro-6-cyclopentyl-phenol, 2.4-dinitro-6-chloro-phenol, 2.6-dinitro-4-methyl-phenol, 2.5-dinitro-4-cyclohexyl-phenol, 2.4-dinitro-5-naphthylamino-phenol, 2.4-dinitro-5-ortho-toluidino-phenol and the like may be employed.

The alkylene-diamine and the polymethylene-diamine addition salts of dinitro-phenols as set forth in the preceding examples may be used as active toxicants in either spray or duct compositions for the control of plant parasites. While many of these compounds exert a fungicidal action, others have been found particularly well adapted for use in insecticidal compositions.

When employed in dust mixtures, the amine salts are preferably dispersed in and on solid, finely divided, inert carriers such as diatomaceous earth, volcanic ash, bentonite, talc, finely divided wood flour, and the like. For dusting purposes, compositions comprising from about 0.5 to 5 per cent by weight of the amine salt are particularly useful.

Dispersions of the salts on or in inert carriers may also be employed in water suspension as agricultural sprays for dormant or summer application to growing trees or as eradicant fungicides. In preparing dust mixtures for use in such aqueous compositions, the amine salts may be employed in amount up to 50 per cent by weight of the finely divided solid concentrate, although from 15 to 25 per cent by weight is preferred. Similarly, aqueous solutions or dispersions of the amine salts are useful in parasite control.

Various wetting, sticking, and dispersing agents such as glyceryl oleate, alkali metal caseinates, aluminum naphthenate, alkali metal salts of aromatic hydrocarbons and phenols, sodium lauryl sulfate, partially neutralized sulfuric acid derivatives of fatty acids and oils, blood albumen, soap, and the like may be employed in combination with the new amine salts. Similarly the amine salts can be combined with other insecticidal and fungicidal agents such as petroleum, fish and vegetable oils, lead arsenate, sulfur, copper sprays, and the like for the control of various insect and fungous pests.

A representative composition found valuable for the control of agricultural parasites is the following:

| | Parts by weight |
|---|---|
| Ethylene-diamine mono-salt of 2.4-dinitro-6-cyclohexyl-phenol | 40 |
| Bentonite | 40 |
| Sodium lauryl sulphate | 20 |

The foregoing materials were ground and mixed together and applied in the amount of 1.5 pounds per 100 gallons of water to plants infested with the adults and young of red spiders. Within 24 hours after application a 100 per cent kill of the spiders was obtained.

Among the compounds with which the present invention is particularly concerned are those having the following general formula:

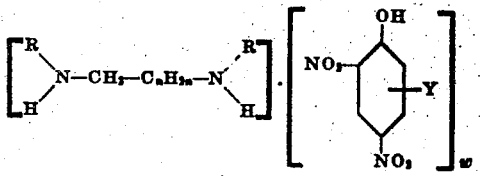

wherein R represents a member of the group consisting of alkyl, alkenyl, hydroxy-alkyl, cycloalkyl, and aralkyl radicals and hydrogen, Y represents a member of the group consisting of aryl, cycloalkyl, aralkyl, and alkyl radicals and hydrogen, $n$ is an integer, and $w$ is an integer not greater than 2.

Mono-salts falling within this group of compounds have the probable formula:

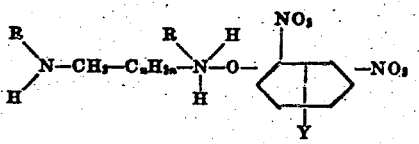

wherein R, Y, and $n$ are as set forth above. Similarly the di-salts may be identified as those having the formula:

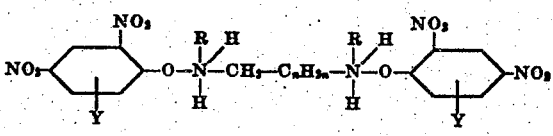

in which R, Y, and $n$ are as previously identified.

We claim:
1. An alkylenediamine salt of 2.4-dinitro-6-cyclohexyl-phenol having the formula

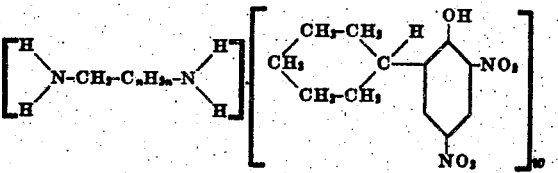

wherein $n$ is an integer, and $w$ is an integer not greater than 2.

2. The ethylenediamine mono-salt of 2.4-dinitro-6-cyclohexyl-phenol having the formula

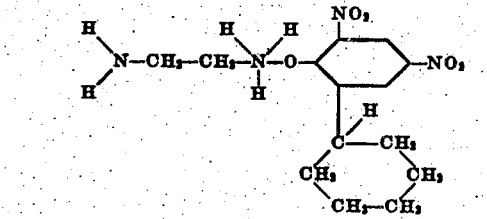

FRANK B. SMITH.
JOHN N. HANSEN.